Nov. 17, 1970     J. F. WHITSEL     3,541,243
VISUAL ASSIST MANUAL PROGRAMMING SYSTEM FOR PROVIDING
DATA TO CONTROL A CUTTING TOOL
Filed Dec. 19, 1966
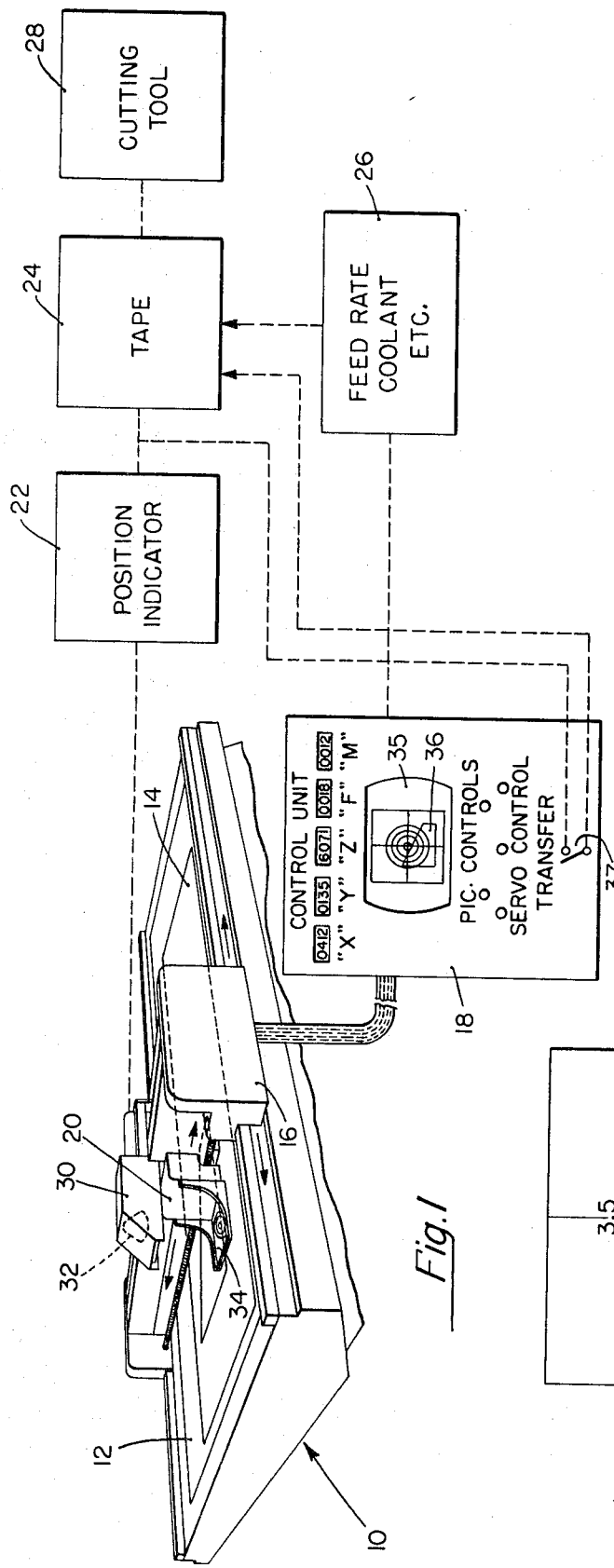
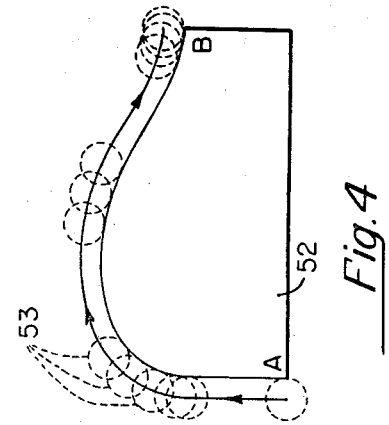
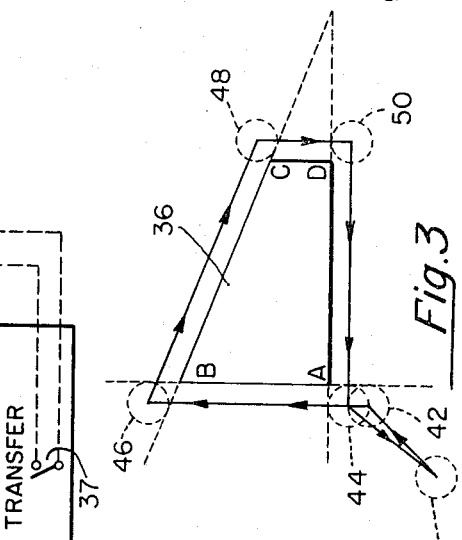
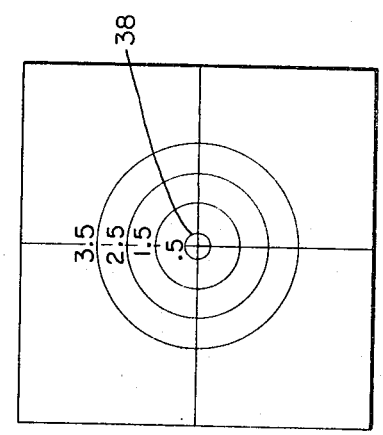
INVENTOR.
JAY F. WHITSEL
BY
*Edward M Farrell*
ATTORNEY

United States Patent Office 3,541,243
Patented Nov. 17, 1970

3,541,243
VISUAL ASSIST MANUAL PROGRAMMING SYSTEM FOR PROVIDING DATA TO CONTROL A CUTTING TOOL
Jay F. Whitsel, Southampton, Pa., assignor to The Budd Company, Philadelphia, Pa., a corporation of Pennsylvania
Filed Dec. 19, 1966, Ser. No. 602,697
Int. Cl. G11b 31/00
U.S. Cl. 178—6.6                    6 Claims

ABSTRACT OF THE DISCLOSURE

Means for converting data from a drawing to a tape to control a tool is provided. An image represents the size of the tool. A television camera views the drawing and the image is moved to follow the drawing. An operator may insert additional data on the tape as the image is moved.

---

At the present time, there are numerous systems for operating automatic machine tools in response to a numerical program. The program may be stored in a storage medium such as punch cards, punched tape or magnetic tape.

The information is generally read out of the storage device to produce control signals. These control signals may actuate a servo mechanism which may be used to drive a cutting tool, for example. The cutting tool may be incorporated in a milling machine, a drill, a lathe or any other power driven machine tool.

The first step in an overall numerical control system generally involves the use of dimension data from an engineering drawing to establish planned moves of a tool to machine desired surfaces. In many cases, data relating to the drawing involves the copying of certain coordinates on a manuscript. The data from the manuscript is then generally transferred to a tape by any conventional means, such as a tape punch machine. The information on the tape, with its associated functions relating to the operation of the tool, is then used to control various mechanisms to move the tool along its desired path.

In manually recording coordinates from a drawing onto a manuscript, additional calculations relating to the dimensions of the tool must be made. For example, the center line of the tool is not the path associated with the actual lines of the drawing. Corrections must be made for the radius of the tool because the cutting path of the tool is generally the outer periphery of the cutting tool.

In order to assist an operator to accurately record coordinates associated with a drawing, television viewing means have been employed in the past. These means have made it possible to enlarge certain portions of the drawing to permit an operator to follow the lines of a drawing with greater accuracy. As is well known, a zoom television camera generally includes optical lenses to attain views of different sizes.

It is possible to include various patterns within an optical system associated with the vidicon or to project patterns on to a drawing to permit tracing of paths. However, either of these two arrangements would necessitate correction means if distortions within the arrangements are different than distortions in the view of the drawings.

It is an object of this invention to provide an improved means for reading data from a drawing and storing the data in a storage medium.

It is a further object of this invention to provide an improved system for reading data from a drawing relating to a cutting path for a tool and for storing the data in a recording medium.

It is still a further object of this invention to store information relating to a cutting path for a tool wherein calculations relating to the dimensions of the tool are minimized.

It is still a further object of this invention to provide an improved tracing means in combination with a television viewing camera wherein different size views of a drawing may be viewed without the need for reproduction equipment.

In accordance with the present invention, a reticle pattern of the size and shape of an intended cutting or forming tool is placed over a drawing, draft or template. The reticle is moved to follow the planned cutting or forming path with data relating to the various positions of the reticle being recorded on tape along with other coded data relating to the cutting tool operation, such as feed rate. Coded data may be selectively entered or omitted dependent upon tape format requirements. The data recorded relates to the center point of the cutting tool. The drawing may be viewed and enlarged by means of a television camera. The camera, being independent of the reticle, does not require refocusing or other adjustments when different size views are taken of the drawing.

Other objects and advantages of the present invention will be apparent and suggest themselves to those skilled in the art to which the present invention is related, from a reading of the following specification and claims, in conjunction with the accompanying drawing in which:

FIG. 1 illustrates a system, partly in block diagram form, incorporating the subject invention;

FIG. 2 illustrates a pattern which may be incorporated in a reticle or pattern holder included in FIG. 1;

FIG. 3 illustrates a device to be cut by a cutting tool and the general path that a cutting tool will take, in accordance with the subject invention; and FIG. 4 is a view illustrating an irregular shaped object to be cut by a cutting tool and a path that the cutting tool will take, in accordance with the subject invention.

Referring particularly to FIG. 1, a drafting machine 10 includes a top table area 12 including a sheet of drawing 14 thereon. The table area may be of any suitable size and may be made tiltable by well known means.

A movable frame member 16 is adapted to be moved across the drawing 14 in a longitudinal direction. This direction may be generally indicated as the axis X or coordinate. The direction transverse to the X axis may be considered as the Y axis or coordinate. A carriage 30 is disposed to be moved transversely across the frame 16.

A control unit 18 includes means for controlling various servo mechanisms (not illustrated) to cause the frame member 16 to move along the Y axis. The carriage 20 by appropriate manipulation by an operator may be disposed at any point over the drawing 14. Because the control of the movement of the carriage 20 does not specifically relate to the subject invention and is well known to those skilled in the art, details relating to such movements are not illustrated for purposes of clarity.

The positions of the frame member 16 and carriage 20 may be indicated by a number of well known means, such as tapped potentiometers which may produce output voltage signals representative of the positions of the carriage. The position of the carriage 20 at any point may be recorded by the operator by a suitable switch 37 located on the control unit. The position of the carriage 20 will be represented in the position indicator 22. When it is desired to record this position, the operator may depress the switch at the control unit to cause the information from the position indicator to be transferred to a recording medium such as a tape 24. At the same time that the information relating to the position of the carriage 20 is reocrded, other data relating to the operation of a cutting tool, such as the feed rate and the coolant, may be recorded on a tape 24 from a plurality of sources generally indicated for the purposes of illustration as a single source 26. Actually this source may be within the same physical housing as the control unit.

The control unit 18 may include a number of different control elements, as well as indicators displaying the various positions of the reticle 34. For example, in addition to indications to display the position for the X and Y axis, other controls and indicators may relate to the Z position. Other controls and indicators may relate to certain preparatory functions, such as linear interpolation and other functions. Still other indicators and controls may relate to the feed rate functions and miscellaneous functions. An operator may constantly insert or change various functions during the positioning operation. For example, he may wish to vary the speed rate of the tool, vary the feed rate of a part, or in some cases omit various functions from the recorded data. The provision which makes it possible for an operator to manually control the operations relating to the insertion of various functions while viewing the tracing operation is an important feature of the subject invention.

The data on the tape 24 may be stored indefinitely and used to provide the input data to control various mechanisms for operating a cutting tool 28. The overall system has been described in general terms because such systems are well known to those skilled in the art. The subject invention is particularly related to the means for reading the data from the drawing prior to actual recording and manually controlling the data to be recorded.

The carriage 20 includes a mounting 30 which includes viewing means, such as a television viewing camera 32. The television viewing camera 32 is disposed to view portions of the drawing 14. The control unit 18 includes a picture tube 35 which disposed to view portions of the drawing 14. The control unit 18 includes a picture tube 35 which displays the picture picked up by the television camera 32.

Also attached to the carriage 20 is a reticle 34 including a plurality of concentric patterns or images disposed thereon. An example of some of the patterns which may be inscribed on the reticle is illustrated in FIG. 2. The reticle is substantially parallel with respect to the table but conceivable tilting means may be provided if desired. The various dimensions associated with the concentric patterns represents the actual dimensions of a cutting tool which would be ultimately used in a cutting operation. It is understood that patterns other than circular may be used. For example, square, triangular or any other shapes may be used, dependent upon the tool to be controlled and the operation to be performed, i.e., cutting, punching, drilling, etc.

In assuming that the diameter of the cutting tool is .5 inch, the innermost concentric circle of the reticle would be used in tracing the cutting path of the tool. The tangent point of the pattern representing the cutter is placed at the edge of the part to be cut represented by the lines in the drawing. It is noted that this point represents an actual point of the cutting path. Therefore, when data relating to these tangent points are recorded, there is no need for offset calculations for the radius or diameter of the cutting tool. This feature greatly simplifies the recording of data from the drawing. As the reticle is moved to different points on the drawing, the operator may record the different points on the tape 24 by the operation of the switch 37 which causes the transfer of the data at the position indicator 22 to the tape 24.

As mentioned, the television camera 32 is adapted to pick up different size views from the drawing. This may be done by means of an optical system or other suitable means. The reticle 34 with its patterns of concentric circles is independent of the television camera and its associated lens system. Therefore, magnification of the field viewed by the camera can be changed without affecting the scale of the pattern in relation to the drawing beneath it. If the pattern were included in the optical system of the television camera instead of being independent as in the subject invention, the scale of the cutter pattern in relation to the drawing may be different for different views. The latter arrangement would necessitate adjustments or correction of the viewing camera when different views were made.

The use of the subject invention involving means for enlarging a view of an operation of the drawing enables an operator to trace the drawing with extreme accuracy. In some cases, in case of inaccuracy within the drawing, the operator may provide a correction which will make the recorded data more accurate than the drawing.

It is noted that distortions within the television viewing or display systems will not affect the accuracy of the recorded information. For example, distortions relating to the drawing which make the drawing wider than usual will also be present in the reticle. It is seen that if the reticle with the pattern were included in the television system that distortions within the pattern would be different than distortions associated with the drawing viewed. It would be difficult to adjust a means within the television system to compensate for distortions within the drawing viewed if the reticle pattern and the drawing were independent of each other.

Thus the subject invention includes two features to facilitate the recording of data from a drawing without calculations. The first feature relates to means for utilizing a pattern having some dimensional relationship to a tool to accurately follow the actual path to be followed by the tool. It is assumed of course that compensation can be readily made for different scaled drawings. In some cases allowance will be also made to provide tolerances in the part being formed or cut. The second feature of the invention involves the use of a reticle independently of the television viewing system.

FIGS. 3 and 4 illustrate how the reticle may be moved to different positions to permit the recordation of data from a drawing.

Referring particularly to FIGS. 1, 2 and 3, for purposes of explanation, it is assumed that an item 36 is the shape of an element to be eventually cut by the cutting tool 28 (FIG. 1). This item 36, disposed below the patterns of the reticle 34, is viewed by an operator within the viewing screen 35 of the control unit 18.

The corners of the item 36 are indicated as ABCD. The line AB is disposed parallel to the Y axis and the line AD is disposed parallel to the X axis. The line BC may be extended at each end as indicated by the dotted lines. Likewise the lines CD and AD are extended in like manner as also indicated by dotted lines.

The reticle pattern representing the tool dimension is then chosen. In the example given, the dimension of the cutting tool may be .5 inch. The reticle 34, at its starting position has the inner pattern or image 38 initially disposed at a starting point 40. This starting point is recorded on the tape 24 by the operator closing the switch 37 at the control unit causing the data from the position indicator 22 to be transferred to the tape 24.

The reticle is then moved to point 42, where the pattern or image 38 is tangent to and left of the extended line AB. The center of the image 38 is moved along a parallel non-coincident or offset path with respect to the lines of the drawing. The reticle is then moved in the Y direction to point 44 which is just below the extended line AD. This position is recorded on the tape 24. From the position 42 the reticle is moved so that the pattern 38 is at point 46. This point is tangent to the extended line BC. The poin 46 is recorded on the tape 24. Next, the reticle is then moved to point 48 to the extensions of lines BC and CD. This point is recorded on the tape. The reticle is then moved in a −Y direction to point 50 which is tangent to extended line AD. This latter point is recorded on the tape. The reticle is then moved in a −X direction at a tangent to line AD past line AB to point 44. This position is also recorded. From point 44, the reticle is moved to its original starting point 40, with the last position also being recorded on a tape.

The movements of the reticle simulates the actual path to be taken by a cutting element. As is seen, there is no need for manually recording the points of the drawing onto a manuscript and then transferring the data from the manuscript onto a tape. Likewise, time consuming steps involving offset corrections for the dimensions of the cutter are not necessary.

The various angles of movement of the cutting tool from point to point may be calculated by the computer. This may be done by a comparison of two consecutive points. These calculations are relating to control interpolation and other items not particularly related to the subject invention and hence are not described in detail because such techniques are well known to those skilled in the art.

It is realized that in some cases it may be desirable to trace the lines of a drawing along the inside lines; as well as the outside lines which has been illustrated. For example, punch and die drawings may require corresponding male and female parts to be formed.

While the subject invention is illustrated as having the image or pattern on the reticle as being substantially the same size as the tool, this does not preclude some variations to compensate for tolerances or other special circumstances requiring some deviation from having the pattern or image the same size than the tool to be used.

While the reticle 34 is illustrated as including a plurality of solid circular lines, it is apparent that these lines may take a variety of forms. For example, double lines having a very narrow space therebetween may be employed. In this case, the space between the two solid lines may be considered as a line for tracing purposes and a line to the drawing being traced may be a line within the space between the two solid lines. This arrangement is useful where the lines on the television screen may include main lines with thickened relatively light fuzzy areas on the side of the main line. Also, the actual drawing being copied may be fuzzy, that is, have solid lines with fuzzy thickened areas on either side.

An object to be cut which includes curves having no dimensions or formula presents a more complicated problem than the item or object 36 which includes only straight lines. In the prior art involving curved objects, the drafting line or template designating the shape to be machined had to be first described in a series of points so that intermediate points could be calculated within the required tolerance. The intermediate points and the cutter offset or center line path was then computed.

In the visual aided manual programming approach, as is described in the present invention, the reticle pattern becomes equivalent to the tool diameter and is placed in a relative milling position tangent to the line to be machined. By implementing the movement of the reticle an amount within the required tolerance in a controlled direction close to the curve direction, the points can be recorded in a manner described in connection with FIG. 3.

Referring particularly to FIG. 4, which involves a curved object, the reticle 34 is moved with its innermost pattern tangentially along the edge of the element 52. Again the center of the image is moved along a parallel non-coincident or offset path with respect to the lines of the drawing. Various points along the edges of the device 52 are recorded. For example, at each point of the dotted circles 53, the operator closes the switch 37 to transfer data from the position indicator 22 to the tape 24. The number of points which has to be recorded is dependent upon the shape of the object and the tolerances involved.

As mentioned, it is some times desirable to enlarge the view of a portion of the drawing being traced. This enables an operator to follow the edge of the drawing figure more accurately and may enable corrections for slight inaccuracies in the drawing. The operator in the present invention is able to view the drawing at different sizes while still maintaining the same relative relationship between the drawing and the reticle pattern. He is able to maintain this relationship without the need of adjusting any control in the control unit.

As mentioned, at the same time that the information relating to the drawing is recorded on the tape 24, data from the source 26 (which may also be within the control unit) may be simultaneously recorded. The information from the source 26 may be precalculated so that the overall system is capable of recording simultaneously all the information necessary to drive the cutting tool. This facilitates the recordation of data and minimizes the amount of time required for such recordation.

The subject invention has been described in terms of two dimensions involving the X axis and the Y axis. Similar techniques may be employed by taking data from side views of the drawing for example, to obtain data relating to the Z axis.

The various techniques for programming the system disclosed have not been discussed. It is believed that these programming techniques are well known to those skilled in the field and are only incidentally related to the subject invention. A basic program, as is well known, may include the recording of various so-called N functions, which could be related to the sequence of the steps to be followed. So-called G functions followed by various digits may relate to various preparatory functions to be recorded on the tape. So-called M functions may include various miscellaneous functions which may be recorded on a tape. So-called F functions may include data relating to feed rate for insertion on the tape.

An operator at a control panel is free to insert or change the various functions as the drawing is being traced. Consequently, the information ultimately stored on the tape is all that will be needed to drive a cutting tool. It is understood of course that this does not preclude some adjustment at the actual cutting tool site during the cutting operation.

While the subject invention has been discussed in connection with a cutting tool and a part to be cut, it is understood that the invention may be used in connection with drilling, punching and other machine operations. In these latter cases, the machine controlled may be a drill, a punch or other type of tool other than a cutting tool.

It is also understood that the pattern and tool represented has been illustrated as being circular. Actually, the patterns and tools may assume various different shapes, such as square or rectangular.

Also, as mentioned, the pattern or image in some cases may deviate somewhat from the precise dimensions of the tool to be controlled.

What is claimed is:

1. An arrangement for transferring data from a drawing representing a part to be formed by a cutting tool to a record medium and for controlling the cutting tool, comprising:
   (A) a flat element having an image thereon dimensionally related to said tool and placed on said drawing,
   (B) means for selectively moving said element along an offset parallel path with respect to the lines of said drawing while continuing to maintain said element adjacent said drawing,
   (C) television camera means for detecting an image of said drawing and element,
   (D) television monitor means connected to said camera for displaying the image of said drawing and element, (E) means for developing first signals representative of additional information required to form said part, (F) means to display said additional information along with said image of the drawing and said element, (G) means to develop second signals respresentative of the position of said element, (H) a storage medium, (I) means to selectively record said second signals representative of the position of said element at inflection points of said drawing on said storage medium and to record said first signals representative of additional information on said storage medium simultaneously with the second signals, (J) a cutting tool, (K) means for applying said first and second signals to said cutting tool to actuate said cutting tool along a path corresponding to the data displayed on said drawing.

2. The invention as set forth in claim 1 wherein said image on said element is a circular pattern and means are provided to move the circular pattern tangentially along the lines of the drawing representing said part to be formed.

3. The invention as set forth in claim 2 wherein said circular pattern is of substantially the same dimension as said tool.

4. The invention as set forth in claim 3 wherein said element with said image is disposed in close proximity to said drawing and a television is used to view different sizes of said image and portions of said drawing, whereby the relationship between said image and portions of drawing viewed is the same for when different sizes are viewed.

5. The invention as set forth in claim 1 wherein means are provided to permit an operator to manually vary and record said additional data at the same time as said data relating to said drawing is recorded.

6. The invention as set forth in claim 1 wherein said image comprises a pair of closely spaced lines.

References Cited
UNITED STATES PATENTS

| | | | |
|---|---|---|---|
| 3,024,396 | 3/1962 | Peckjian | 318—162 |
| 3,105,907 | 10/1963 | Colten et al. | 250—202 |
| 3,178,717 | 4/1965 | Fengler | 346—33 |
| 3,193,833 | 7/1965 | Davis | 346—8 |
| 3,217,331 | 11/1965 | Wetzel et al. | 346—1 |
| 3,260,848 | 7/1966 | Gordon | 250—202 |

ROBERT L. GRIFFIN, Primary Examiner

R. K. ECKERT, JR., Assistant Examiner

U.S. Cl. X.R.

346—33